(12) United States Patent
Bosselmann et al.

(10) Patent No.: US 8,217,333 B2
(45) Date of Patent: *Jul. 10, 2012

(54) FLOWMETER HAVING AT LEAST TWO OPTICAL WAVEGUIDES AND ONE CONTROLLED ELECTRICAL HEATING ELEMENT FOR DETERMINING A FLOW DIRECTION

(75) Inventors: Thomas Bosselmann, Marloffstein (DE); Michael Willsch, Jena (DE)

(73) Assignee: Siemens Aktiengesellschsft, Munich (DE)

( * ) Notice: Subject to any disclaimer, the term of this patent is extended or adjusted under 35 U.S.C. 154(b) by 880 days.

This patent is subject to a terminal disclaimer.

(21) Appl. No.: 12/225,206

(22) PCT Filed: Feb. 1, 2007

(86) PCT No.: PCT/EP2007/050990
§ 371 (c)(1),
(2), (4) Date: Sep. 16, 2008

(87) PCT Pub. No.: WO2007/104605
PCT Pub. Date: Sep. 20, 2007

(65) Prior Publication Data
US 2009/0165551 A1 Jul. 2, 2009

(30) Foreign Application Priority Data
Mar. 16, 2006 (DE) .................. 10 2006 012 229

(51) Int. Cl.
*H01J 40/14* (2006.01)
(52) U.S. Cl. ...................... 250/221; 250/238
(58) Field of Classification Search .................. 250/221, 250/238, 222.1, 227.14, 227.25, 576; 356/356.1, 356/28, 28.5; 73/170.12, 204.23, 861.11–861.23; 340/870–870.07
See application file for complete search history.

(56) References Cited

U.S. PATENT DOCUMENTS
5,517,862 A 5/1996 Berrong
(Continued)

FOREIGN PATENT DOCUMENTS
DE 4242132 A1 6/1994
(Continued)

OTHER PUBLICATIONS

Sensors and Actuators A, Elsevier Sequoia S.A., Lausanne, CH, Bd. 127, Nr. 1, Feb. 28, 2006, Seiten 63-68 Jewart et al: "X-probe flow sensor using self-powered active fiber Bragg gratings".

(Continued)

*Primary Examiner* — Que T Le
(74) *Attorney, Agent, or Firm* — Staas & Halsey LLP (57) ABSTRACT

A flowmeter determines the flow direction of a fluid. The flowmeter has a measuring element, around which the fluid flows and which comprises at least one fiber-optic cable and at least two electrical heating elements that lie adjacent to the fiber-optic cable(s) by a respective heat stream emanating from the respective heating element and directed towards at least one fiber-optic cable, the directions of the heat streams being at least proportionately reversed. In addition, the values of the individual heat streams can be influenced to different extents, depending on the flow direction of the fluid. An electromagnetic wave that can be coupled into the fiber-optic cable(s) can also be influenced according to the temperature of the fiber-optic cable(s). Additionally, the flow meter has a control unit, which is used to feed electric energy to the two or more heating elements one after the other, and an evaluation unit, which is used to evaluate the temperature effect of the electromagnetic wave that emanates from the individual heat streams and to determine the flow directed of the fluid.

23 Claims, 10 Drawing Sheets

U.S. PATENT DOCUMENTS

| | | | |
|---|---|---|---|
| 7,302,844 B2 * | 12/2007 | Birkle et al. | 73/204.23 |
| 7,854,164 B2 * | 12/2010 | Bosselmann et al. | 73/170.12 |
| 2006/0117844 A1 | 6/2006 | Birkle et al. | |

FOREIGN PATENT DOCUMENTS

| | | |
|---|---|---|
| DE | 10162592 A1 | 6/2002 |
| DE | 10251701 A1 | 6/2004 |
| EP | 0853370 A1 | 7/1998 |
| EP | 1591627 A1 | 11/2005 |
| GB | 2079470 A | 1/1982 |
| GB | 2401430 A | 11/2004 |
| JP | 05-180860 | 7/1993 |
| JP | 11-326359 | 11/1999 |
| JP | 2005-172713 | 6/2005 |
| JP | 2006-504966 | 2/2006 |
| JP | 2006-504966 | 9/2006 |
| WO | WO 2004042326 A2 | 5/2004 |

OTHER PUBLICATIONS

Charles Jewart et al., "X-probe flow sensor using self-powered active fiber Bragg gratings," Sensors and Actuators A: Physical, vol. 127, Issue 1, Elsevier B.V., pp. 63-68, 2006.

Japanese Office Action for corresponding Japanese Application No. 2008-558742, issued on Jan. 11, 2011.

Russian Office Action for corresponding Russian Application No. 2008140937/28(52993).

Japanese Office Action for corresponding Japanese Patent Application No. 2008-558742, issued on Jan. 11, 2011.

* cited by examiner

FLOWMETER HAVING AT LEAST TWO OPTICAL WAVEGUIDES AND ONE CONTROLLED ELECTRICAL HEATING ELEMENT FOR DETERMINING A FLOW DIRECTION

CROSS REFERENCE TO RELATED APPLICATIONS

This application is based on and hereby claims priority to German Application No. 10 2006 012 229.1 filed on Mar. 16, 2006 and PCT Application No. PCT/EP2007/050990 filed on Feb. 1, 2007, the contents of which are hereby incorporated by reference.

BACKGROUND OF THE INVENTION

The present invention relates to a flowmeter for determining a flow direction of a fluid. The invention also relates to a method for determining a flow direction of a fluid and to an electrical machine having the flowmeter.

In all rating classes of electrical machines, but in particular relatively high-rating machines, a considerable amount of heat is developed which must be dissipated by cooling measures in order to achieve better machine efficiency and/or a longer life. By way of example, air-cooled machines such as generators or motors are known, in particular with ratings of less than 300 MVA, in which cooling is provided by a comparatively large air flow. This air flow may in particular be passed through a line system which comprises numerous flow channels (cf. for example DE 42 42 132 A1 or EP 0 853 370 A1). For example, the flow channels of the line system can be used to force air from the outside inward through the stator of the machine. At the same time, however, air is sucked in by the machine rotor and is forced from the inside outward through the stator, in the opposite direction. If the two airflows are superimposed disadvantageously, the flow ceases to flow within the line system, therefore possibly leading to local overheating of and damage to the machine.

WO 2004/042326 A2 specifies a flowmeter for determining a flow rate of a fluid which is flowing around a measurement element in the flowmeter, such as a gas flow, having an optical waveguide which has a plurality of fiber Bragg gratings and having at least one electrical heating element which is arranged adjacent to the waveguide. This allows the flow rate along the longitudinal extent of the measurement element to be determined from the influence of the temperature on the conductor on an electromagnetic wave which is fed into the optical waveguide. The optical waveguide can be heated via the electrical heating element with a constant amount of heat being applied, resulting in a temperature distribution in the longitudinal direction on the measurement element, corresponding to the local flow rate. This flowmeter is therefore suitable for determining a multiplicity of local flow rates using just one single measurement element. However, it is not possible to determine the direction into which the fluid is flowing relative to the measurement element.

SUMMARY

One potential object is therefore to provide a flowmeter and a method by which the flow direction of a fluid can be determined, and of specifying an electrical machine in which the flow direction of a cooling fluid can be monitored.

The inventors propose a flowmeter for determining a flow direction of a fluid, having a measurement element around which the fluid can flow and having at least two optical waveguides and having at least one electrical heating element, which is arranged adjacent to the optical waveguides, in which heat can be applied to the optical waveguides via a respective heat flow, which is directed from the at least one heating element to the respective optical waveguides, at least a proportion of the directions of the heat flows is in opposite directions, the individual heat flows are correlated to different extents with the flow direction of the fluid, and at least one electromagnetic wave, which can be injected into the optical waveguides, can be influenced in accordance with the respective temperature of the optical waveguides, a control unit by which electrical power can be supplied to the at least one heating element, and an evaluation unit, by which it is possible to evaluate the temperature influence, originating from the individual heat flows, on the at least one electromagnetic wave, and to determine the flow direction of the fluid.

The measurement element, whose longitudinal extent is preferably arranged at right angles to the flow direction of the fluid in it has different local flow conditions over the circumference of its cross section, which, in particular, is circular. Heat is therefore not transported uniformly over the circumference of the cross section on the surface of the measurement element, because of the locally different flow rates of the fluid. For this reason, when a constant amount of power is supplied to the at least one heating element, a different heat flow respectively occurs in the direction of the optical waveguides in the measurement element, as a function of the position of the optical waveguides in the measurement element. Different temperatures can therefore occur at each of the locations on the optical waveguides as a function of the arrangement of the optical waveguides relative to the flow direction. Finally, the flow direction of the fluid which is flowing around the measurement element can be deduced by determining the corresponding temperature differences.

It is therefore advantageous if the optical waveguides each comprise at least one fiber Bragg grating and the at least one electromagnetic wave which can be injected into the optical waveguides can be influenced in accordance with the respective temperature of the optical waveguides at the location of the at least two fiber Bragg gratings. A sensor type such as this is distinguished by its particular multiplexing capability, so that a sensor network can be provided in a simple manner. A further advantage of the fiber Bragg grating technology is the capability to carry out a measurement virtually at a point, that is to say a locally very tightly constrained measurement. It is thus possible when a relatively high measurement accuracy is required, in particular a measurement accuracy with position resolution, along the measurement element, to arrange a plurality of fiber Bragg gratings close to one another and following one another in the respective optical waveguides.

In order to allow better distinction, the fiber Bragg gratings which are arranged in an optical waveguide preferably each use mutually different main wavelengths. In each fiber Bragg grating, a component of the at least one electromagnetic wave that is fed in, with this component being governed by the respective main wavelength, is reflected back. The main wavelength changes with the influencing variable prevailing at the measurement location, in this case in particular the temperature of the optical waveguide. This change in the wavelength range (or wavelength spectrum) of the respective portion reflected back of the at least one electromagnetic wave that is fed in will be used as a measure of the influencing variable to be detected. However, in principle, it is also possible to investigate the transmitted portion of the at least one electromagnetic wave that is fed in, for the change in the wavelength spectrum. In particular, a broadband light source can be used to check the fiber Bragg grating by the at least one electromagnetic wave, for example an LED (light-emitting diode) with a bandwidth of about 45 nm, an SLD (superluminescence diode) with a bandwidth of about 20 nm or a tunable laser with a bandwidth of about 100 nm.

It is proposed that the measurement element be in the form of a rod. The measurement element can advantageously be fitted easily and, for example, can be introduced into the flow channel through an opening. Furthermore, it is possible to achieve a situation in which the measurement element can be maintained with little fitting effort. For this purpose, the corresponding attachments are released and the measurement element is pulled out through the opening. In addition, of course, the measurement element may be in any other desired form. For example the measurement element may be circular or else in the form of an Archimedes screw.

A further refinement proposes that the measurement element be elastic. Depending on the purpose, the measurement element can therefore advantageously be pre-shaped quickly, thus making it possible to reduce the number of different measurement element shapes. Storage costs can be saved.

It is advantageous for the at least one heating element to be formed from metal. This ensures uniform heating along the heating elements.

It is also proposed that the at least one heating element be formed by a common electrically conductive coating on the optical waveguides, with the optical waveguides being in contact in the longitudinal direction. This makes it possible to further simplify the shape of the measurement element. The heating element can thus in each case be integrally connected in a simple manner to the waveguides which make contact with one another, thus allowing a protective function to be achieved for the waveguides by the heating elements, in addition to cost-effective production. By way of example, the conductive coating may be formed from a metal such as tungsten or else from an alloy such as steel or the like.

It is also proposed that the at least one heating element have a constant electrical resistivity. This advantageously makes it possible to apply heat uniformly to the measurement element over its longitudinal extent. For the purposes of this application, the electrical resistivity means the electrical resistance per length unit.

Furthermore, it is proposed that the resistivity be largely independent of temperature in the operating temperature range. This makes it possible for the respective heat supply, which is directed from the at least one heating element in the direction of the optical waveguides to be substantially independent of the instantaneous local temperature along the longitudinal extent of the measurement element. This makes it possible to increase the measurement accuracy as well as the reliability of the measurement. Furthermore, the at least one heating element may, for example, be formed from a material such as constantan.

One advantageous development proposes that the measurement element have a sheath. The measurement element can thus, for example, be protected against chemical attack. Furthermore, the sheath allows mechanical protection, for example during fitting.

It is also proposed that the sheath be composed of a ceramic material. A measurement element for a high temperature load can advantageously be formed with the ceramic sheath.

In addition, it is proposed that the sheath be formed by a metal sleeve. For example, the measurement element can then advantageously be protected against electrostatic charging, since the metal sleeve can be connected to a ground potential.

Furthermore, it is proposed that the sheath (8) at the same time have the at least one heating element (6, 7). Components and costs can be further reduced.

The inventors also propose a method for determining a flow direction of a fluid by a flowmeter, in which
  at least one electromagnetic wave is injected into at least two optical waveguides of a measurement element around which the fluid flows,
  at least one heating element for the measurement element is supplied with electrical power such that,
    heat is applied by the heating elements to the optical waveguides, and
    the at least one electromagnetic wave is influenced to a different extent as a function of the different local temperature in the at least two optical waveguides,
  the different influences on the at least one electromagnetic wave are determined and the flow direction of the fluid at right angles to the longitudinal extent of the measurement element is determined from this.

The method results in the advantages that have been explained above for the flowmeter.

It is therefore also advantageous for the optical waveguides each to comprise at least one fiber Bragg grating and for the at least one electromagnetic wave to be influenced as a function of the different local temperatures at the location of the respective at least one fiber Bragg grating.

Furthermore, it is proposed that the at least one electromagnetic wave be formed by at least one electromagnetic pulse. Energy can advantageously be saved, and the measurement accuracy increased. The electromagnetic pulse may, for example be produced by a pulsed laser, which is injected into the optical waveguides by a suitable known coupling unit.

It is also proposed that the measurement element be heated in its longitudinal extent by the at least one heating element. The flow rate along the measurement element can also advantageously be determined from the temperature variation along the measurement element resulting from fluid flow.

It is advantageous for a constant electrical power to be applied to the at least one heating element. Particularly in the case of a resistance profile which is constant over the longitudinal extent of the measurement element, this makes it possible to ensure that a constant amount of heat is applied in each case, in accordance with Ohm's Law. This can be done by direct current or alternating current. In particular, the heating effect of the at least one heating element can be influenced by variation of the alternating-current frequency, if the frequency is varied in a range in which current displacement effects occur.

One advantageous development of the method proposes that a plurality of measurements be carried out with a different power applied. This allows the measurement accuracy to be increased further.

It is also proposed that a gas, in particular air, or a liquid, in particular water or liquid nitrogen be used as the fluid for cooling an electrical machine, in particular a generator or motor. The measurement element used in the flowmeter can in this case be matched cost-effectively to the physical and/or chemical requirements in the flow channel of a cooling device of the generator or of the motor. Furthermore, a flow distribution in the cross section of a flow channel can likewise be measured accurately.

Furthermore, the inventors propose an electrical machine having
- a rotor which is mounted such that it can rotate,
- an associated fixed-position stator in a machine housing,
- a device for cooling parts by a fluid within the machine housing, with the cooling device containing a line system, and
- the flowmeter described above.

In this case, a measurement element, which is arranged in a flow channel of the line system of the flowmeter is provided in order to measure the flow direction of the fluid in the flow channel.

The electrical machine gains the advantages as explained above for the flowmeter.

The flowmeter makes it possible to achieve efficient cooling of the machine by monitoring the flow direction of the cooling fluid, for example air, in the flow channels of the cooling device. Any cessation of flow that occurs as a result of disadvantageously superimposed flows can in this case be identified sufficiently early that suitable measures can be taken in order to avoid local heating of and damage to the machine. The reliability of operation of the flow machine can therefore be increased.

It is proposed that the measurement element be arranged radially with respect to the cross section of the flow channel. In this case, the flow direction can advantageously be determined as a function of the radius of the flow channel cross section using a plurality of fiber Bragg gratings arranged one behind the other. A plurality of measurement elements may, of course, also be provided in the flow channel in order to make it possible to determine the flow direction at different circumferential positions of the flow channel.

It is also proposed that a plurality of measurement elements be arranged at a distance from one another axially in the flow channel. This advantageously allows axial changes in the flow direction to be recorded and evaluated. It is also possible to use a plurality of differently shaped measurement elements in order to obtain the desired information about the flow profile. For example, it is possible to combine radial measurement elements in the form of rods with measurement elements arranged along a circular line in the flow channel. In particular, it is proposed that the measurement elements be operated using the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
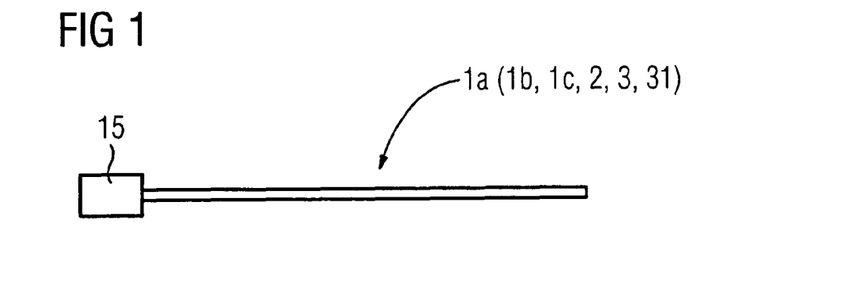
FIG. 1 shows a side view of a measurement element of the proposed flowmeter in the form of a rod, with a connecting plug at one end.

FIG. 1 shows a side view of a measurement element 1a, 1b, 1c, 2, 3 or 31 of the proposed flowmeter, with a plug connection 15 fitted to one end of the measurement element 1a, 1b, 1c, 2, 3 or 31 for connection of the measurement element 1a, 1b, 1c, 2, 3 or 31 to a control unit 20 and an evaluation unit 23 (see FIGS. 8 to 12 and FIG. 14). The measurement element 1a, 1b, 1c, 2, 3 or 31 is in the form of a rod. Furthermore, the measurement element 1a, 1b, 1c, 2, 3 or 31 may be elastic, such that the geometric shape can be matched to the specified requirements.

In FIGS. 2 to 13, a coordinate system 80 is in each case associated with an x, y and a z axis in order to assist clarity. For the sake of simplicity, and without any restriction, it is assumed that the fluid 22 to be investigated is flowing in the x direction. The fluid 22 which is flowing in the x direction is in this case indicated by arrows pointing in the x direction. The fluid 22, which is flowing in the x direction and arrives at the measurement element 1a, 1b, 1c, 2, 3 or 31 which extends in the y direction, flows around the latter. In particular, the fluid flow is a turbulent flow. Different flow rates occur on the surface 9 of the measurement element 1a, 1b, 1c, 2, 3 or 31. The length of the arrows in this case reflects the magnitude of the fluid velocity at the indicated location. While the velocities are highest on that part of the measurement element surface 9 which is directed substantially in the opposite direction to the flow direction, they are lowest on that part of the measurement element surface 9 which points substantially in the flow direction. In this case, heat is transported through the measurement element surface 9 inhomogeneously, as a function of the local flow rate. The heat transport on that part of the measurement element surface 9 which is directed substantially in the opposite direction to the flow direction, is therefore greater than on that part of the measurement element surface 9 which points substantially in the flow direction. If the measurement element 1a, 1b, 1c, 2, 3 or 31, which has at least one heating element 5, 6 or 7 for example at the center of the cross-sectional area of the measurement element 1a, 1b, 1c, 2, 3 or 31, is in thermal equilibrium at least with respect to its cross section while heat is being applied to it by the at least one heating element 5, 6 or 7, an optical waveguide 4a which is arranged at or relatively close to that part of the measurement element surface 9 which is directed substantially in the opposite direction to the flow direction will be at a lower temperature than an optical waveguide 4b which is arranged at or relatively close to that part of the measurement element surface 9 which points substantially in the flow direction. Optical waveguide 4a which is arranged at or relatively close to that part of the measurement element surface 9 which is directed substantially in the opposite direction to the flow direction is subjected to a lesser heat flow 10a from the direction of the at least one heating element 5, 6 or 7 than an optical waveguide 4b which is arranged at or relatively close to that part of the measurement element surface 9 which points substantially in the flow direction. The heat flow associated with this optical waveguide 4b is annotated 10b. The arrows which point in the direction of the respective optical waveguide 4a, 4b starting from the at least one heating element 5, 6 or 7 in this case indicate the corresponding heat flow 10a, 10b, whose magnitude is reflected in the respective arrow length.

Figure 2:
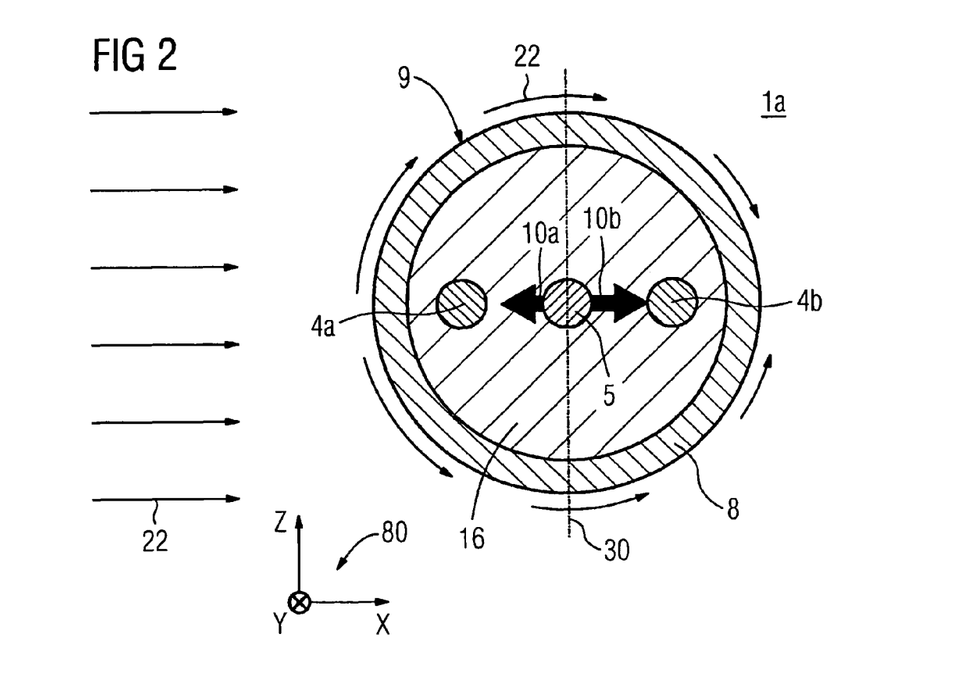
FIG. 2 shows a section through one refinement of a measurement element with a heating conductor and two optical waveguides arranged parallel to it.
Figure 3:
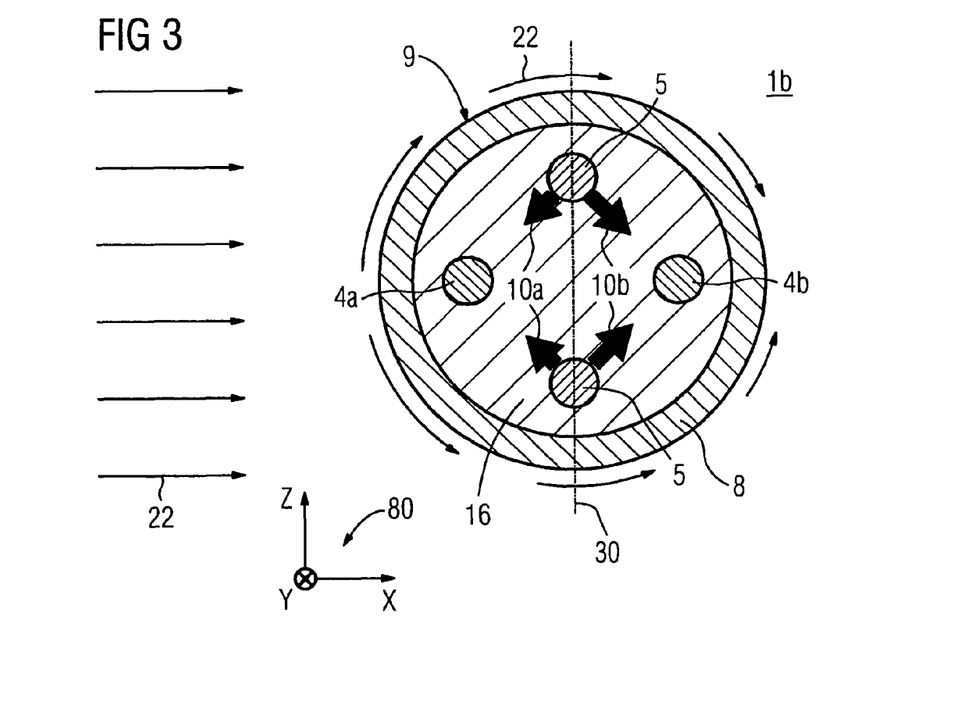
FIG. 3 shows a section through one refinement of a measurement element with two heating conductors and two optical waveguides arranged parallel to them.
Figure 4:
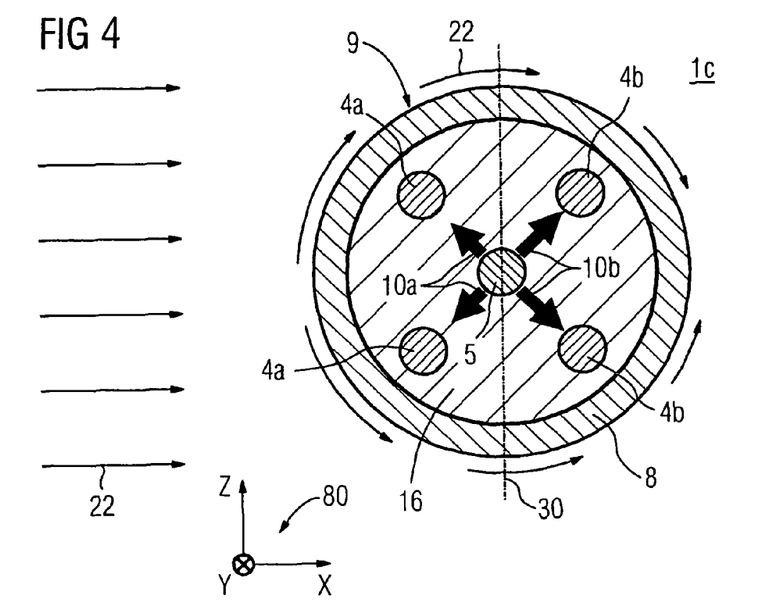
FIG. 4 shows a section through one refinement of a measurement element with a heating conductor and four optical waveguides arranged parallel to it.

FIG. 2, FIG. 3 and FIG. 4 show three refinements of a respective measurement element 1a, 1b, 1c of the flowmeter. According to the exemplary embodiment shown in FIG. 2, two optical waveguides 4a, 4b and a heating element 5 arranged between them are contained in the measurement element 1a, embedded in a ceramic material. According to the exemplary embodiment in FIG. 3, two optical waveguides 4a, 4b and two heating elements 5 arranged in between them are contained, embedded in the ceramic material, in the measurement element 1b. In each of the FIGS. 2 and 3, an optical waveguide 4a is arranged close to that part of the measurement element surface 9 which is directed substantially in the opposite direction to the flow direction, while the other optical waveguide 4b is positioned close to that part of the measurement element surface 9 which is directed substantially in the flow direction. The single heating element 5 in FIG. 2 and the two heating elements 5 in FIG. 3 are arranged on an axis of symmetry 30 of the respective measurement element 1a or 1b, which at the same time represents the mirror axis with respect to the two optical waveguides 4a, 4b, such that their respective distances from the two optical waveguides 4a, 4b correspond to one another. According to the exemplary embodiment in FIG. 4, four optical waveguides 4a, 4b and a heating element 5 arranged between them are contained, embedded in the ceramic material, in the measurement element 1c. The four optical waveguides 4a, 4b are arranged in pairs close to that part of the measurement element surface 9 which is directed substantially in the opposite direction to the flow direction, and respectively close to that part of the measurement element surface 9 which is directed substantially in the flow direction. The heating element 5 is arranged on an axis of symmetry 30 of the measurement element 1c, which at the same time represents the mirror axis with respect to the optical waveguide pairs 4a, 4b, such that their distances from the respect optical waveguides 4a, 4b correspond to one another. By way of example, the optical waveguides 4a, 4b are glass or plastic fibers. The at least one heating element 5 and the optical waveguides 4a, 4b are embedded in a body 16 which is composed of ceramic material, in particular is cylindrical and is itself surrounded by a passivating sheath 8. The one (see FIGS. 2 and 4) or the two (see FIG. 3) heating elements 5 is or are, for example, in the form of heating wires. The sheath 8 in one embodiment can also be formed from a metal, such that it is electrically conductive (see FIGS. 8 and 10).

Figure 5:
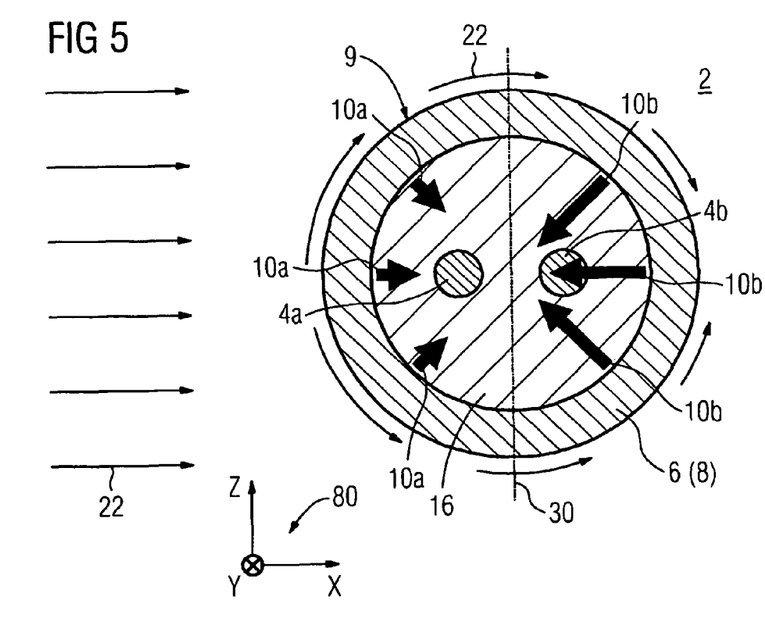
FIG. 5 shows a section through a further refinement of a measurement element with a heating element surrounding two optical waveguides.

FIG. 5 shows a further refinement of a measurement element 2 of the flowmeter according to the invention with two optical waveguides 4a and 4b which are surrounded by a body 16 which is composed of ceramic material and in particular is cylindrical. One optical waveguide 4a is arranged close to that part of the measurement element surface 9 which is directed substantially in the opposite direction to the flow direction, while the other optical waveguide 4b is positioned close to that part of the measurement element surface 9 which is directed substantially in the flow direction. A heating element 6 is arranged around the ceramic body 16 such that it surrounds the measurement element 2. In particular, the heating element 6 at the same time forms a sheath 8, in the form of a sleeve for the measurement element 2.

Figure 6:
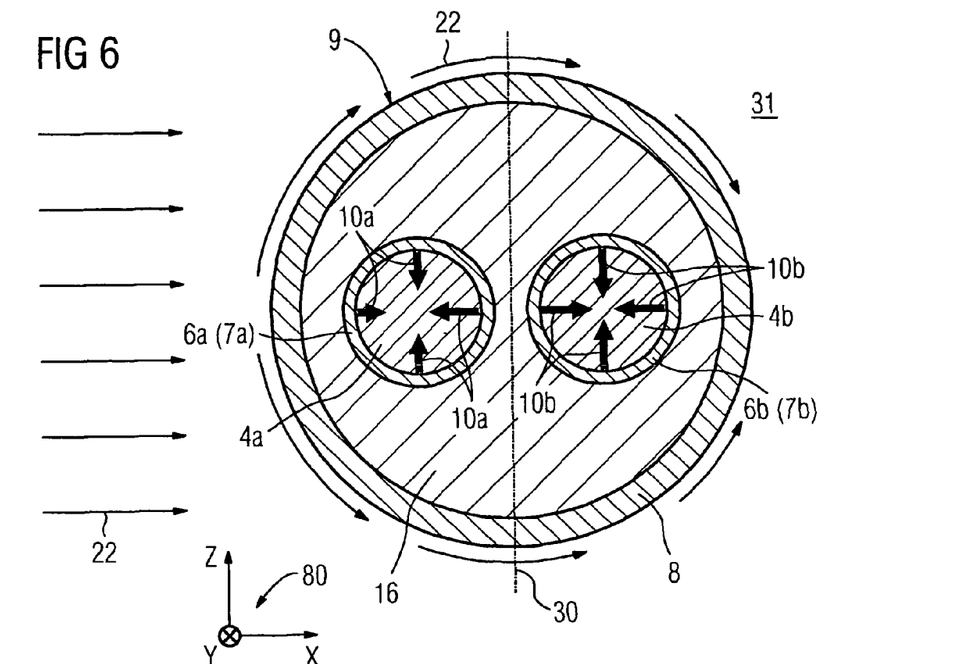
FIG. 6 shows a section through a refinement of a measurement element with two optical waveguides which are arranged parallel and are each surrounded by a heating element.

FIG. 6 shows a further refinement of a measurement element 31 of the flowmeter according to the invention with two optical waveguides 4a and 4b. Each optical waveguide 4a, 4b is surrounded by a corresponding heating element 6a, 6b or 7a, 7b in the form of a sleeve 6a, 6b or a coating 7a, 7b. The heating elements 6a, 6b or 7a, 7b are in turn surrounded by a body 16, which is composed of ceramic material and in particular is cylindrical. One optical waveguide 4a with an associated heating element 6a or 7a is arranged close to that part of the measurement element surface 9 which is directed substantially in the opposite direction to the flow direction, while the other optical waveguide 4b is positioned, with the associated heating element 6b or 7b, close to that part of the measurement element surface 9 which is directed substantially in the flow direction. The ceramic body 16 itself is in turn surrounded by a passivating sheath 8, in the form of a sleeve, on the measurement element 31.

Figure 7:
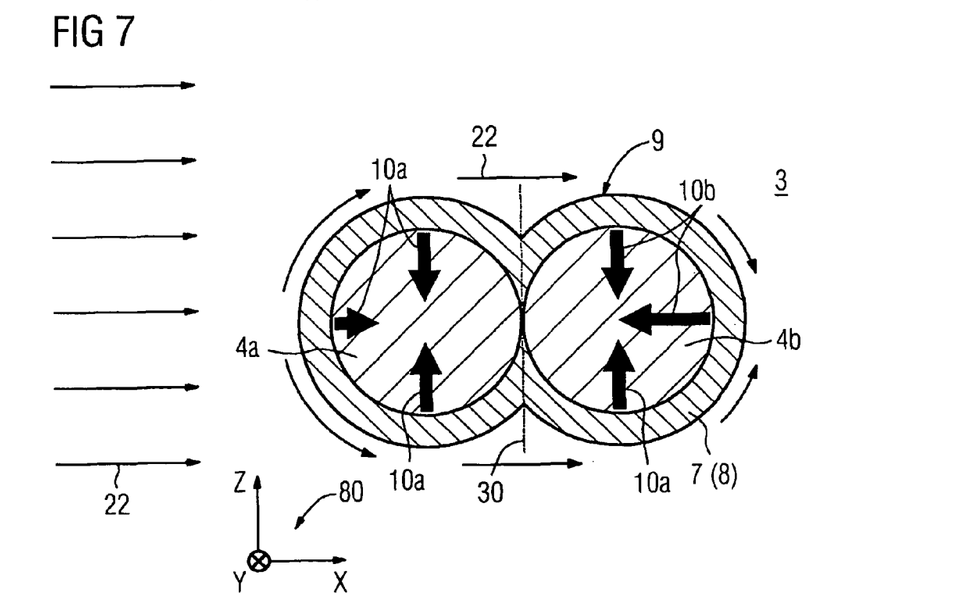
FIG. 7 shows a section through a further refinement of a measurement element with heating element fitted directly to the surfaces of two touching optical waveguides.

FIG. 7 shows a section through a measurement element 3 of the flowmeter according to the invention, with two optical waveguides 4a, 4b lying one on top of the other having metal layers 7a, 7b vapor-deposited on them, at the same time representing a heating element 7 for the measurement element 3. The metal layer 7 forms a common sheath 8 for the optical waveguides 4a, 4b. This refinement is distinguished by elasticity such that the three-dimensional extent of the measurement element 3 can be adapted as required. Furthermore, the measurement element 3 is distinguished by a particularly simple production process, in which the pair of optical waveguides 4a, 4b are coated in a coating process of a conventional, known type, with a suitable electrically conductive material. The refinement is furthermore distinguished in that it has a particularly low heat capacity in comparison to the exemplary embodiments of the measurement element 1a, 1b, 1c, 2 or 31 shown in FIGS. 1 to 6, and therefore reacts more quickly to changing flow conditions.

The heating elements 5, 6 and 7 used in the abovementioned refinements are preferably formed from a metal or a metal alloy. By way of example, steel, copper, aluminum, bronze constantan or the like can be used, depending on the physical and/or chemical load. For high-temperature applications, for example in the flow channel of a gas turbine, a coating with a metal such as tungsten or the like is preferable. For applications at low temperatures in a chemically aggressive environment, for example, it is also possible to use conductive polymers. In the exemplary embodiments described here, the material of the heating elements 5, 6 and 7 in each case has a constant electrical resistance. In particular, the resistance in the operating temperature range is largely independent of the temperature. Application of a constant current or an alternating current with a constant root mean square value to the heating element 5, 6, 7 therefore leads to a power supply which is uniform over the length of the heating elements 5, 6, and 7, such that heat is applied uniformly to the corresponding heating element 5, 6 or 7 over the longitudinal extent of the respective measurement element 1a, 1b, 1c, 2, 3 or 31.

Figure 10:
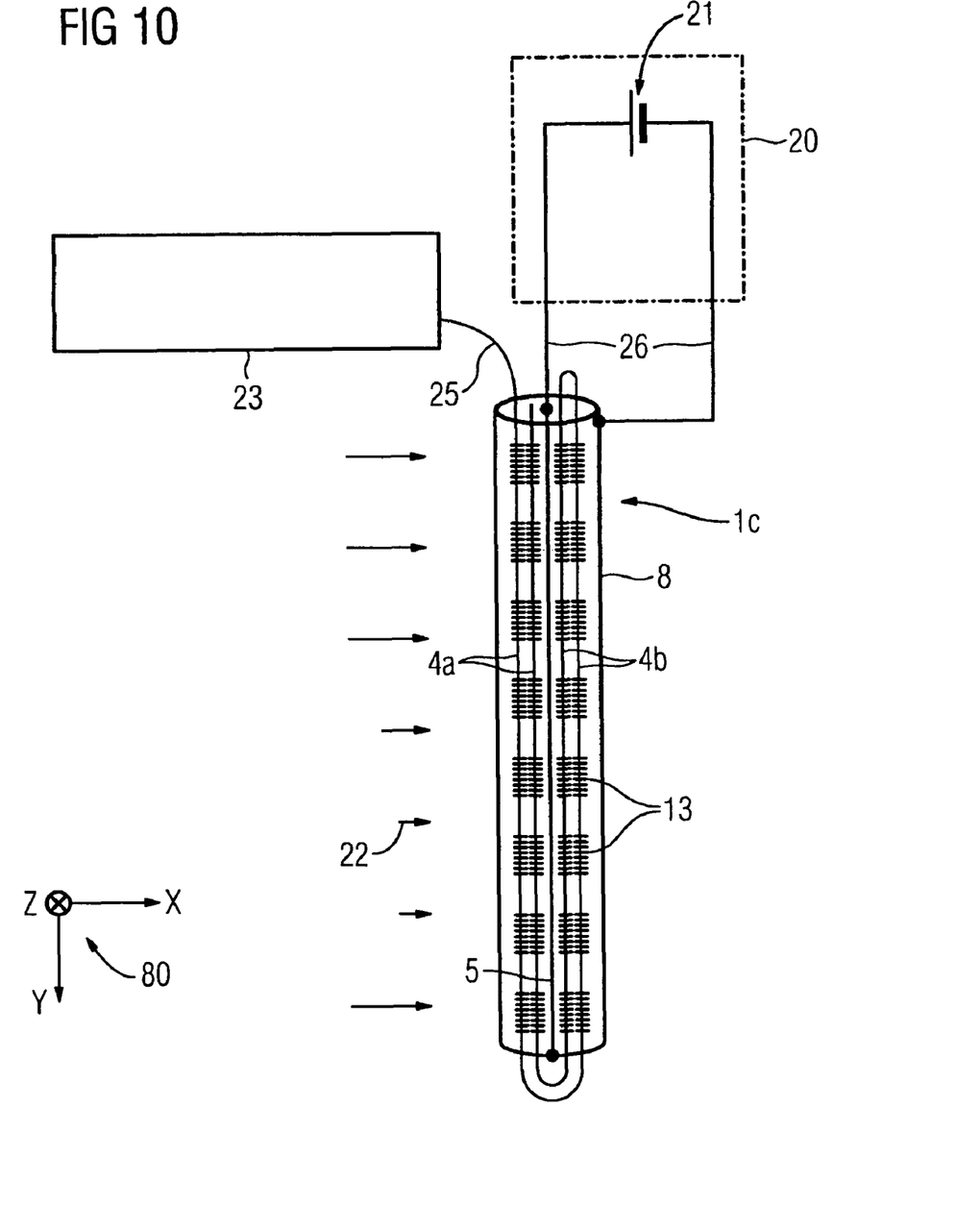
FIG. 10 shows an outline circuit diagram of one embodiment of the flowmeter with the measurement element shown in FIG. 4.
Figure 11:
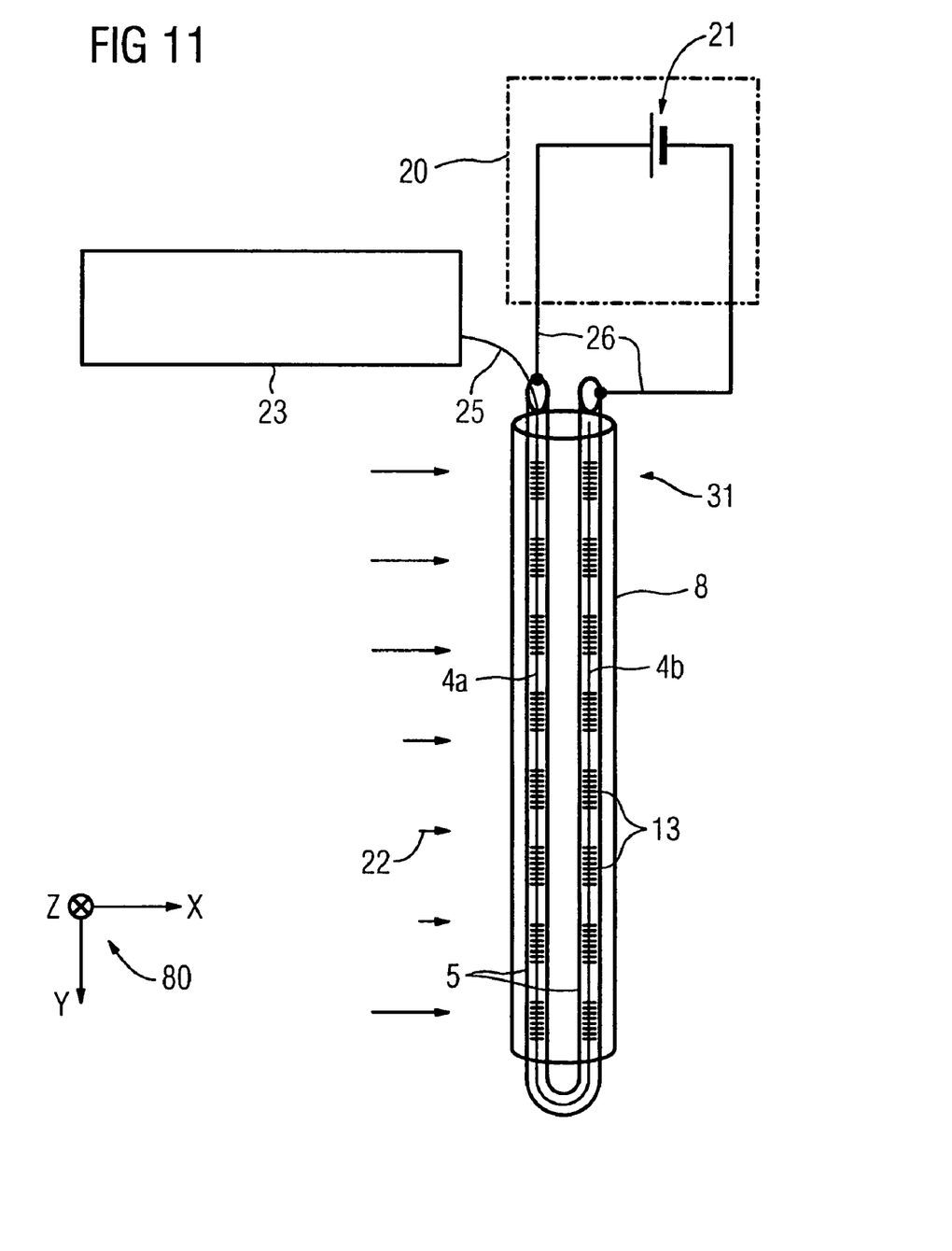
FIG. 11 shows an outline circuit diagram of one embodiment of the flowmeter with the measurement element shown in FIG. 6.
Figure 12:
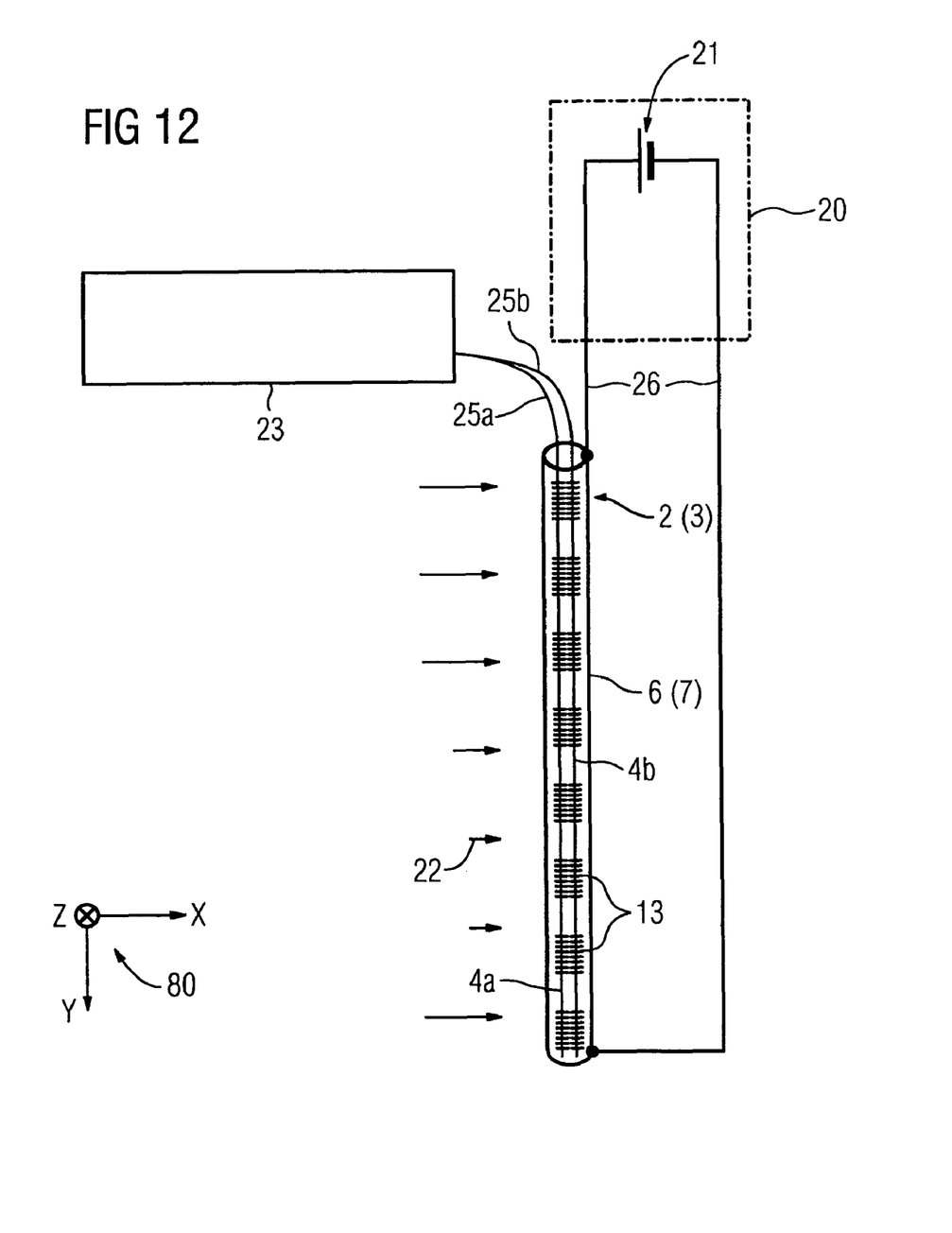
FIG. 12 shows an outline circuit diagram of one embodiment of the flowmeter with the measurement element shown in FIG. 5 or 7.
Figure 13:
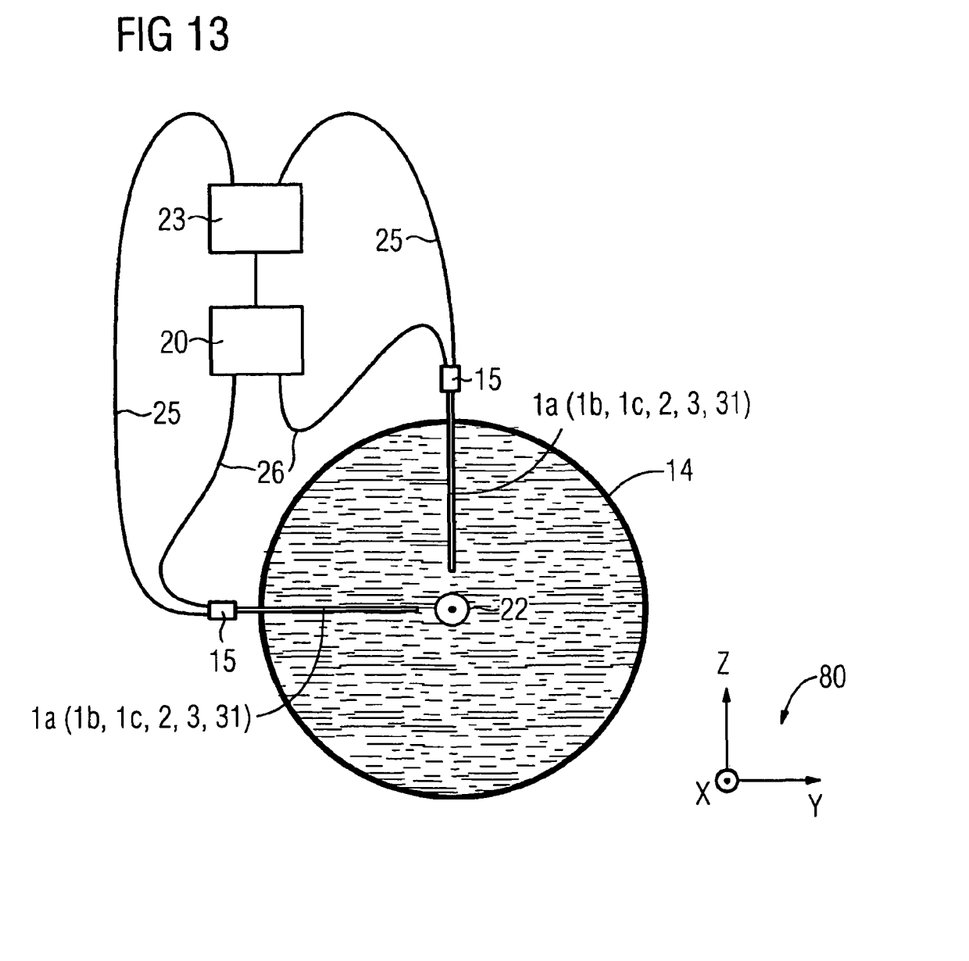
FIG. 13 shows a cross section through a flow channel of a cooling device with a measurement element of the flowmeter.
Figure 14:
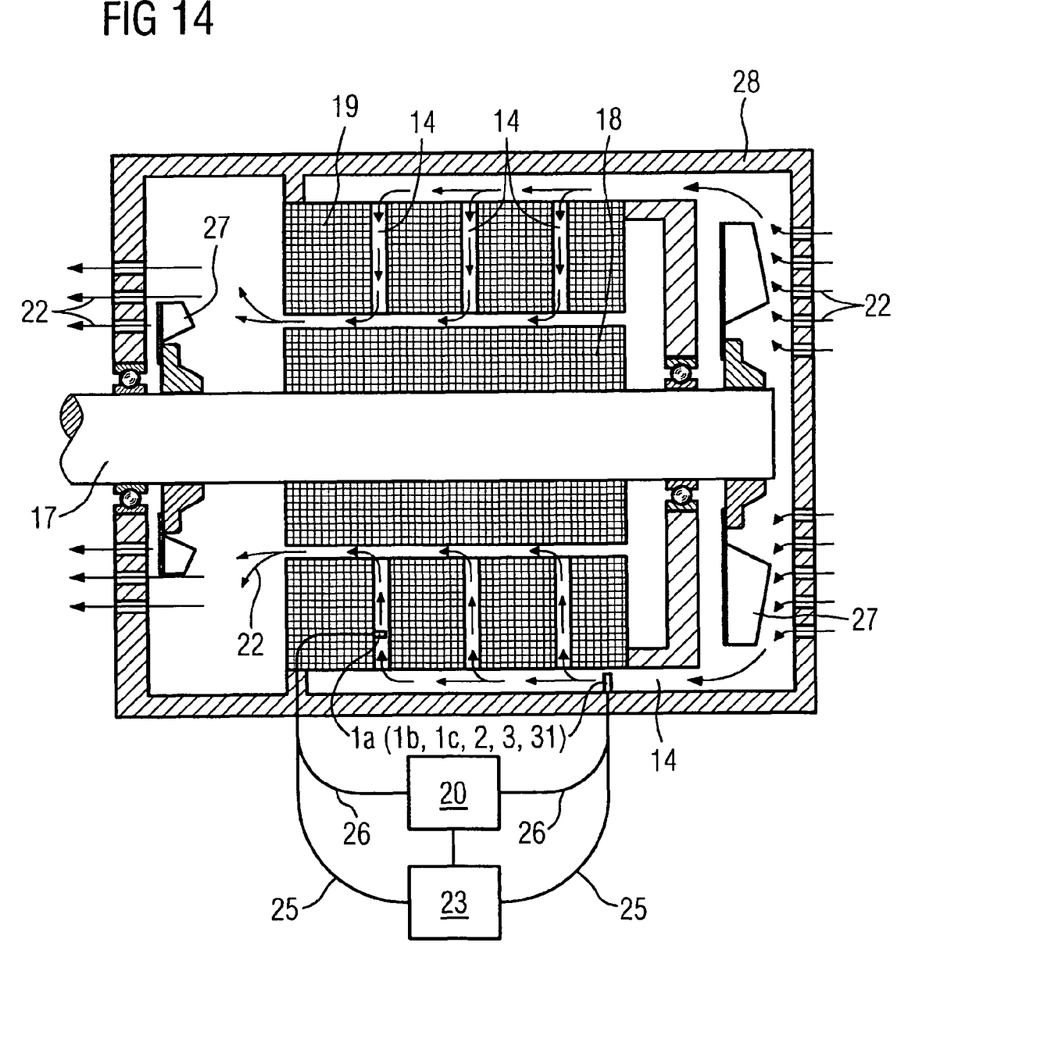
FIG. 14 shows a section through a generator with a plurality of measurement elements of the flowmeter.

FIGS. 8 to 12 show exemplary embodiments of the flowmeter, in the form of outline circuit diagrams. The flowmeter in FIG. 8 in this case comprises the measurement element 1a shown in FIG. 2, the flowmeter in FIG. 9 comprises the measurement element 1b shown in FIG. 3, the flowmeter in FIG. 10 comprises the measurement element 1c shown in FIG. 4, the flowmeter in FIG. 11 comprises the measurement element 31 shown in FIG. 6, and the flowmeter in FIG. 12 comprises the measurement element 2 or 3 shown in FIG. 5 or FIG. 7, respectively. All the exemplary embodiments mentioned of the flowmeter also have a control unit 20 and evaluation unit 23. The respective measurement element 1a, 1b, 1c, 2, 3 or 31 extends with its longitudinal axis in the y direction. The measurement element 2 or 3 of the flowmeter shown in FIG. 12 is electrically connected at its respective ends by heating element 6 or 7 to the control unit 20, and is optically connected to the evaluation unit 23 at one of the two ends. In this case, the two optical waveguides 4a and 4b are jointly connected via a respective optical connecting fiber 25a, 25b to the evaluation unit 23. The measurement element 1a, 1b, 1c or 31 of the flowmeter shown in FIGS. 8 to 11 is electrically connected at one end to the control unit 20, and is optically connected to the evaluation unit 23, while the other end of the measurement element 1 is freely available. This allows the measurement element 1a, 1b, 1c or 31 to be fitted and/or handled particularly easily. One of the optical waveguides 4a, 4b of the measurement element 1a, 1b, 1c or 31 is connected via an optical connecting fiber 25 to the evaluation unit 23, with the optical waveguides 4a, 4b being connected to one another in series. The individual optical waveguides 4a, 4b may, however, also be connected individually to the evaluation unit 23, analogously to FIG. 12, without there necessarily being any connection between them.

The control unit 20 has an electrical power source 21. The power source 21, which has two connections, is connected to the heating elements 5, 6 or 7 in accordance with the exemplary embodiments, such that electrical power is applied to the heating element 5, 6 or 7, and heat is produced. The electrical power source 21 is, in particular, a current source by which a constant direct current can be preset.

The fluid 22 flows around the measurement element 1a, 1b, 1c, 2, 3 or 31, in which case the fluid flow along the longitudinal extent of the measurement element 1a, 1b, 1c, 2, 3 or 31 may have a different flow rate, indicated by the arrows of different length. The flow direction of the fluid 22 points in the x direction, for the sake of simplicity, as already mentioned above. In order to measure the flow direction of the fluid 22, electrical power is applied to the heating element 5, 6 or 7 of the measurement element 1a, 1b, 1c, 2, 3 or 31, as a result of which it is heated. The heating process should in this case continue at least until a thermal equilibrium has been reached in the measurement element 1a, 1b, 1c, 2, 3 or 31. However, it can also be chosen to be shorter.

By the evaluation unit 23, which has a light source, a detector and an analyzer, light in the form of a continuous laser beam or in the form of laser pulses is injected via the optical connecting fiber 25 into the optical waveguides 4a, 4b of the measurement element 1a, 1b, 1c, 2, 3 or 31, and light that is scattered back is analyzed by the analyzer. The measurement makes use of the effect that an electromagnetic wave which is injected into an optical waveguide 4a, 4b is scattered as it passes through the optical waveguides 4a, 4b. A portion of the scattered light is scattered in the opposite direction, as a result of which it can be detected at the input of the optical waveguide 4a, 4b. The temperature of the optical waveguide 4a, 4b can be deduced because this scattering effect is temperature-dependent. The light signal that is scattered back comprises different components which are of different suitability for the measurement requirements. For example, the signal that is scattered back contains a Raman-scattered component. In comparison to Raman technology, fiber Bragg grating technology makes it possible to achieve higher spatial resolution, which is preferable in particular for use of the temperature measurement in machines.

The laser light is produced in a known manner using equipment from the related art. Depending on the temperature, a portion of the laser light in the optical waveguides 4a, 4b is scattered back from fiber Bragg gratings 13. This light signal which is scattered back is passed via the optical connecting fiber 25 to the evaluation unit 23, which uses this signal to determine the temperature at the location of the fiber Bragg grating 13 in the optical waveguide 4.

The evaluation unit 23 determines the corresponding temperatures, associated with the individual optical waveguides 4a, 4b, within the measurement element 1a, 1b, 1c, 2, 3 or 31. Different temperatures occur in a flowing fluid 22 with a directed flow at the location of the optical waveguides 4a, 4b in the measurement element 1, 2, or 3, depending on the relative position of the respective optical waveguide 4a, 4b. The evaluation unit 23 compares the different temperatures with one another, for example by subtraction in a computer unit associated with the evaluation unit 23, and from this determines the flow direction of the fluid 22.

If the measurement element 1a, 1b, 1c, 2, 3 or 31 has a plurality of fiber Bragg gratings 13 along the optical waveguides 4a, 4b, as is indicated in the exemplary embodiments in FIG. 8 to FIG. 12, the flow rate with the flow rate distribution of the fluid 22 can be determined from the temperature distribution along the measurement element 1a, 1b, 1c, 2, 3 or 31.

Figure 8:
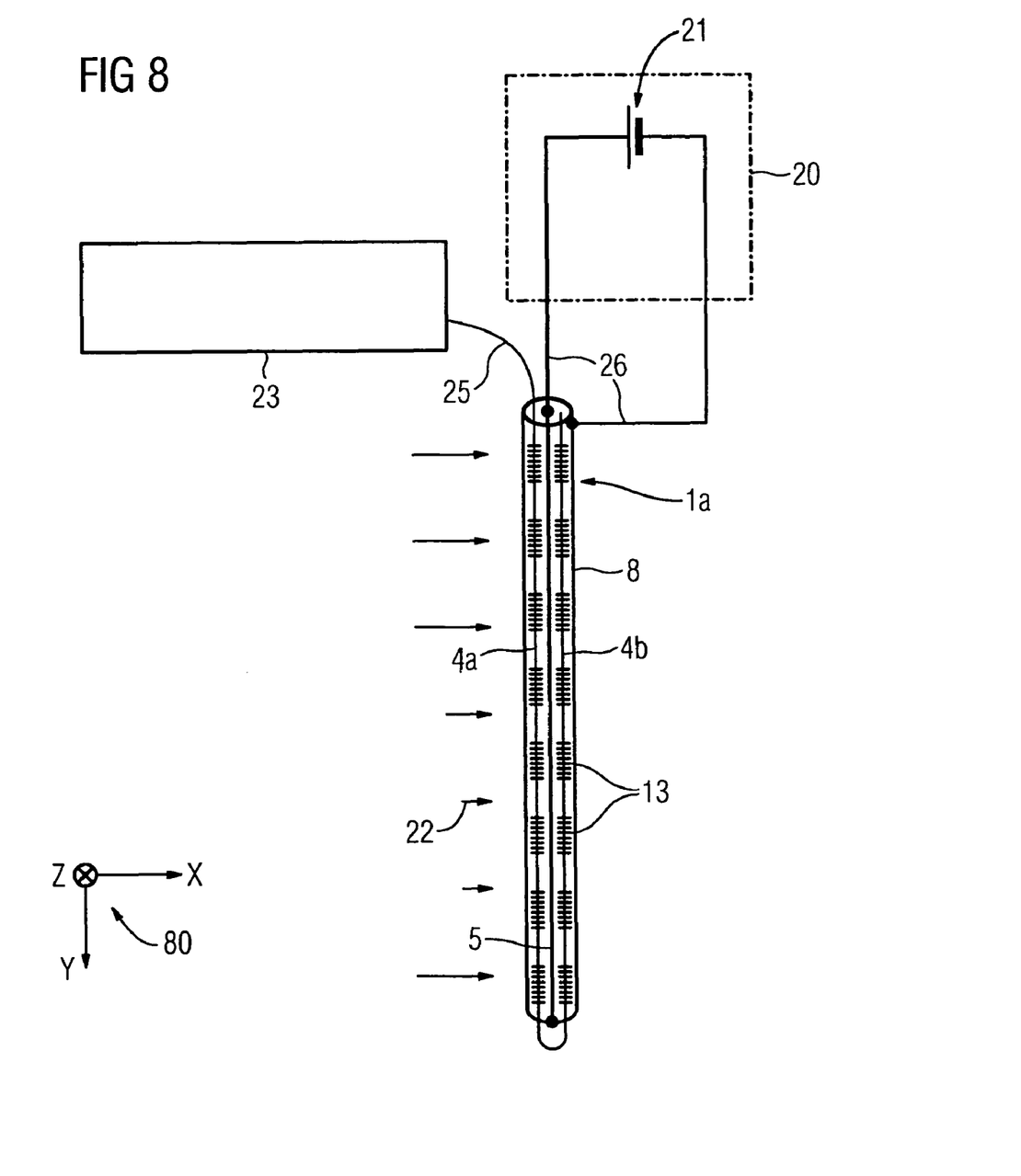
FIG. 8 shows an outline circuit diagram of one embodiment of the flowmeter with the measurement element shown in FIG. 2.

In the exemplary embodiment of the flowmeter shown in FIG. 8, the measurement element 1a has a heating element 5 which, by way of example, is in the form of a heating wire. One connection of the power source 21 is connected to the heating element 5 and the other connection is connected to the electrically conductive sheath 8 on the measurement element 1a. In this case, the heating element 5 is likewise connected at the opposite end of the measurement element 1a to the electrically conductive sheath 8. In the exemplary embodiment of the flowmeter shown in FIG. 9, the measurement element 1b has two parallel heating elements 5, which, for example, are in the form of heating wires, with the two heating wires being jointly connected at one end of the measurement element 1b to an electrical connecting conductor. At the other end of the measurement element 1b, one of the two heating elements 5 is in this case connected to one connection of the power source 21, and the other heating element 5 is connected to the other connection of the power source 21. At one end of the measurement element 1b, the two optical waveguides 4a, 4b which run parallel are likewise jointly connected to an optical connecting fiber, while at the other end of the measurement element 1b, only one of the two optical waveguides 4a, 4b is connected via an optical connecting fiber 25 to the evaluation unit 23.

In the exemplary embodiment of the flowmeter shown in FIG. 10, the measurement element 1 has a total of four parallel optical waveguides 4a, 4b. A heating element 5 in the form of a heating wire is arranged between the optical waveguides. One connection of the power source 21 is connected to the heating element 5, and the other connection is connected to the electrically conductive sheath 8 on the measurement element 1c. In this case, the heating element 5 is likewise connected at the opposite end of the measurement element 1c to the electrically conductive sheath 8. The four optical waveguides 4a, 4b are connected to one another in series by optical connecting fibers at the measurement element ends, such that only one of the optical waveguides 4a, 4b is directly connected to the evaluation unit 23. The use of a measurement element 1c such as this with numerous optical waveguides 4a, 4b which, for example, are arranged in a circular shape around the heating element 5 that is arranged at the center of the cross section of the measurement element 1c, allows the flow direction of the fluid 22 to be determined even more accurately. In the exemplary embodiment of the flowmeter shown in FIG. 11, the measurement element 31 has two parallel heating elements 5 which, for example, are in the form of electrically conductive sleeves or coatings and are both connected together at one end of the measurement element 31. In this case, at the other end of the measurement element 31, one of the two heating elements 5 is connected to one connection of the power source 21, and the other heating element 5 is connected to the other connection of the power source 21. The two optical waveguides 4a, 4b, which run parallel are likewise connected to one another by an optical connecting fiber at one end of the measurement element 1b, while at the other end of the measurement element 1b, only one of the two optical waveguides 4a, 4b is connected via an optical connecting fiber 25 to the evaluation unit 23.

Figure 9:
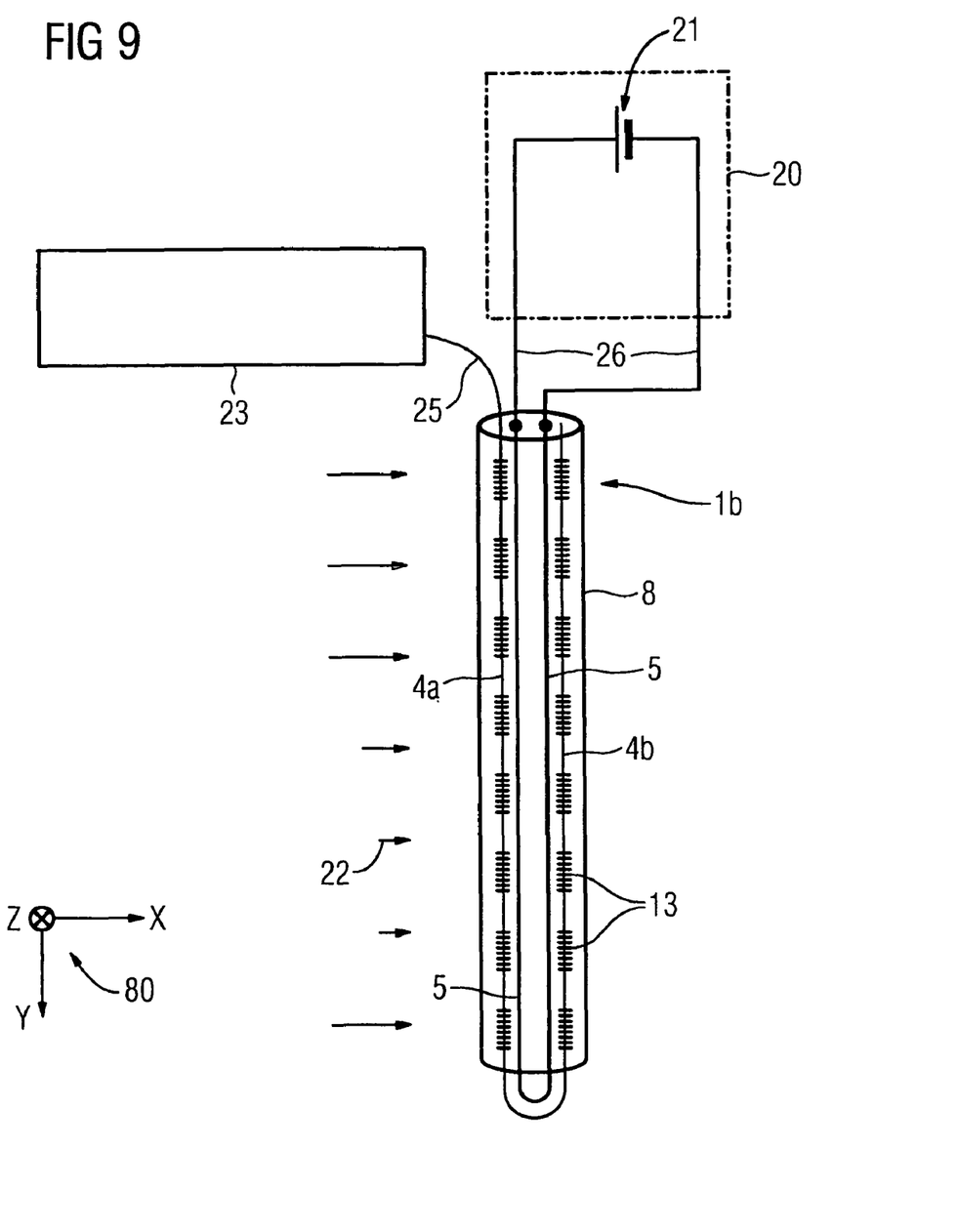
FIG. 9 shows an outline circuit diagram of one embodiment of the flowmeter with the measurement element shown in FIG. 3.

However, analogously to FIG. 8 and FIG. 10, it is also feasible for the two heating elements 5 from FIG. 9 and FIG. 11 to be jointly connected together at one end to the sheath 8, which in this case is designed to be electrically conductive, in such a way that the power source 21 can be likewise be connected to the sheath 8 at the other end of the respective measurement element 1b or 31. In this refinement example, which is not illustrated, it must be possible for both heating elements 5 to be jointly connected to one and the same connection of the power source 21.

In the exemplary embodiment of the flowmeter shown in FIG. 12, one connection of the power source 21 is connected at one end of the measurement element 2 or 3 to the heating element 6 or 7, which is in the form of an electrically conductive sleeve 8 (FIG. 5) or an electrically conductive coating (FIG. 7). The second connection of the power source 21 is connected at the other end of the measurement element 2 or 3 by an electrical line to the heating element 6 or 7.

FIG. 9 shows a round cross section of a flow channel 14 through which a fluid 22 flows in the x direction. In this case, the flow channel 14 is, as an example, provided with two measurement elements 1a, 1b, 1c, 2, 3 or 31, which are arranged radially with respect to the flow channel cross section. The two measurement elements 1a, 1b, 1c, 2, 3 or 31 are connected via an electrical connecting line 26 to the control unit 20, and via an optical connecting fiber 25 to the evaluation unit 23.

FIG. 10 schematically illustrates a generator as an electrical machine. The generator has a stationary stator 19, which is firmly connected to a housing 28, and a rotor 18 which is mounted such that it can move on a rotor shaft 17. The generator is cooled, for example with air as a cooling fluid 22, by a cooling device. For this purpose, the cooling device has two fans 27 which pass the cooling air 22 through the generator by a line system. For this purpose the line system has numerous flow channels, in particular in the stator 19 as well. In the illustrated exemplary embodiment, the cooling air 22 is passed from the outside inward in the direction of the rotor 18 through the stator 19, and is then transported to the outside through a gap arranged between the stator 19 and the rotor 18. At the same time, however, air 22 can be sucked in by the rotor of the generator, and can be forced through the stator 19 in the opposite direction, from the inside outward. If the two air flows are disadvantageously superimposed, this results in the flow being stationary within the line system and therefore, possibly, in local overheating of and damage to the generator. In order to avoid this, the flow direction in the flow channels is monitored by the flowmeter. In this exemplary embodiment, two flow channels each having one measurement element 1a, 1b, 1c, 2, 3 or 31 of the flowmeter are provided, as an example, at two points in the generator. The two measurement elements 1a, 1b, 1c, 2, 3 or 31 are in this case connected to the associated control unit 20 and evaluation unit 23. In the event of irregularities in the cooling air flow, it is therefore possible to react and to initiate suitable protective measures in good time.

The use of the flowmeter in an air-cooled generator in this case serves only as an example. It is also possible to use the flowmeter in electrical machines which are cooled by hydrogen gas, a noble gas or any other desired gas as the fluid 22. A cooling liquid, such as water or else in the case of cryogenic cooling a liquid noble gas or liquid nitrogen, can also be provided as the cooling fluid 22.

The flowmeter can also be used in a turbine, for example in a steam turbine or a gas turbine. The flowmeter thus makes it possible to measure flow directions in particular in turbulent flow areas in the associated cooling air system, in the associated compressor, at the associated compressor inlet and/or in the corresponding exhaust gas flow.

The exemplary embodiments illustrated in the figures serve only to explain the method and device and have no restrictive effect on it. In particular, the type of measurement element 1a, 1b, 1c, 2, 3 or 31, in particular its geometric shape, may thus be varied without departing from the scope of protection. Furthermore, of course, a plurality of elements may also be interconnected in order to make it possible to investigate specific changes in the flow direction more accurately.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A flowmeter to determine a flow direction of a fluid, comprising:
   a measurement element around which the fluid can flow, the measurement element having at least two optical waveguides and at least one electrical heating element adjacent to the optical waveguides such that at least a portion of the heat flows in opposite directions from the at least one heating element towards the optical waveguides, the individual heat flows from the at least one heating element depending on the flow direction of the fluid such that when electromagnetic waves are injected into the optical waveguides, the properties of the electromagnetic waves are influenced by respective temperatures of the optical waveguides and hence the flow direction of the fluid;
a control unit to control electrical power supplied to the at least one heating element; and
an evaluation unit to evaluate how the temperatures influence the electromagnetic waves and to determine the flow direction of the fluid.

2. The flowmeter as claimed in claim 1, wherein the optical waveguides each comprise at least one fiber Bragg grating such that when the electromagnetic waves are injected into the respective optical waveguides, the electromagnetic waves are influenced in accordance with the respective temperatures of the optical waveguides in a vicinity of the respective Bragg gratings.

3. The flowmeter as claimed in claim 1, wherein the measurement element is in the form of a rod.

4. The flowmeter as claimed in claim 1, wherein the measurement element is elastic.

5. The flowmeter as claimed in claim 1, wherein the at least one heating element is formed from metal.

6. The flowmeter as claimed in claim 1, wherein
the at least one heating element is formed by a common electrically conductive coating extending over both of the optical waveguides, and
the optical waveguides are in contact along longitudinal directions thereof.

7. The flowmeter as claimed in claim 1, wherein the at least one heating element has a constant electrical resistivity.

8. The flowmeter as claimed in claim 7, wherein
the at least one heating element has an operating temperature range, and
the resistivity in the operating temperature range is substantially independent of temperature.

9. The flowmeter as claimed in claim 1, further comprising a sheath at least partially enclosing the measurement element.

10. The flowmeter as claimed in claim 9, wherein the sheath is formed of a ceramic material.

11. The flowmeter as claimed in claim 9, wherein the sheath is a metal sleeve.

12. The flowmeter as claimed in claim 11, wherein the at least one heating element is incorporated into the sheath.

13. A method for determining a flow direction of a fluid, comprising:
injecting electromagnetic waves into at least two optical waveguides of a measurement element around which the fluid flows, the optical waveguides having longitudinal extents aligned generally at right angles to a flow direction of the fluid;
supplying electrical power to at least one heating element of the measurement element such that heat flows from the at least one heating element to the optical waveguides, and the electromagnetic waves are influenced to a different extent as a function of different local temperatures in the at least two optical waveguides,
determining the flow direction of the fluid based on how the electromagnetic waves are influenced by the different local temperatures.

14. The method as claimed in claim 13, wherein the optical waveguides each comprise at least one fiber Bragg grating such that when the electromagnetic waves are injected into the respective optical waveguides, the electromagnetic waves are influenced in accordance with the respective temperatures of the optical waveguides in a vicinity of the respective Bragg gratings.

15. The method as claimed in claim 13, wherein the electromagnetic waves are formed by at least one electromagnetic pulse.

16. The method as claimed in claim 13, wherein the optical waveguides are heated in their longitudinal extent by the at least one heating element.

17. The method as claimed in claim 13, wherein a constant electrical power supplied to the at least one heating element.

18. The method as claimed in claim 13, wherein a plurality of measurements are carried out, each with a different power being supplier to the at least one heating element.

19. The method as claimed in claim 13, wherein
the fluid is a gas or a liquid for cooling a generator or a motor.

20. The method as claimed in claim 13, wherein
the fluid is used to cool a machine comprising:
a rotor which is mounted such that it can rotate;
a machine housing; and
a fixed-position stator associated with the rotor and provided in the machine housing,
the fluid flows in the machine housing and through a flow channel for the fluid, and
the measurement element is provided in the flow channel.

21. An electrical machine comprising:
a rotor which is mounted such that it can rotate;
a machine housing;
a fixed-position stator associated with the rotor and provided in the machine housing;
a device for cooling parts using a fluid within the machine housing, the device having a flow channel for the fluid; and
a flowmeter positioned in the flow channel to measure a flow direction of the fluid in the flow channel, the flowmeter comprising:
a measurement element around which the fluid can flow, the measurement element having at least two optical waveguides and at least one electrical heating element adjacent to the optical waveguides such that at least a portion of the heat flows in opposite directions from the at least one heating element towards the optical waveguides, the individual heat flows from the at least one heating element depending on the flow direction of the fluid such that when electromagnetic waves are injected into the optical waveguides, the properties of the electromagnetic waves are influenced by respective temperatures of the optical waveguides and hence the flow direction of the fluid;
a control unit to control electrical power supplied to the at least one heating element; and
an evaluation unit to evaluate how the temperatures influence the electromagnetic waves and to determine the flow direction of the fluid.

22. The electrical machine as claimed in claim 21, wherein the measurement element is arranged radially with respect to a cross section of the flow channel.

23. The electrical machine as claimed in claim 21, wherein a plurality of measurement elements are arranged at an axially displaced distance from one another in the flow channel.

* * * * *